United States Patent
Klein et al.

[11] Patent Number: 6,082,276
[45] Date of Patent: Jul. 4, 2000

[54] DISK COLTER FOR SEED DRILLS

[75] Inventors: Jean Klein, Dossenheim-sur-Zinsel; Edmond Oberle, Haegen, both of France

[73] Assignee: Kuhn S.A., Saverne, France

[21] Appl. No.: 09/179,191

[22] Filed: Oct. 27, 1998

[30] Foreign Application Priority Data

Nov. 4, 1997 [FR] France ................................. 97 14001

[51] Int. Cl.$^7$ ........................................................ A01C 5/00
[52] U.S. Cl. ............................. 111/164; 172/604; 172/575
[58] Field of Search ................................... 172/575, 604, 172/558, 560, 562, 563, 579, 599, 601, 603; 111/163, 164, 165, 166, 168, 169, 14

[56] References Cited

U.S. PATENT DOCUMENTS

| | | | |
|---|---|---|---|
| 501,917 | 7/1893 | Caldwell | 172/558 |
| 522,329 | 7/1894 | Packham | 111/165 |
| 603,863 | 5/1898 | Stephenson | 172/575 |
| 605,348 | 6/1898 | Schultz | 111/165 X |
| 735,815 | 8/1903 | Poirier | 172/575 |
| 736,963 | 8/1903 | Ham | 111/165 |
| 883,304 | 3/1908 | Espich | 172/575 |
| 990,654 | 4/1911 | Hunter | 172/575 |
| 1,104,725 | 7/1914 | Aspinwall | 111/165 |
| 1,124,006 | 1/1915 | Gallespie | 172/560 |
| 2,730,940 | 1/1956 | Rimple | 172/558 |
| 2,815,991 | 12/1957 | Stoffel | |
| 2,917,012 | 12/1959 | Oehler et al. | 172/558 |
| 2,924,189 | 2/1960 | McLeod | 172/560 |
| 3,058,531 | 10/1962 | Beaman | 172/575 |
| 4,337,835 | 7/1982 | Steilen | 172/575 X |
| 4,736,803 | 4/1988 | Roush | 172/560 |
| 5,678,500 | 10/1997 | Schmidt | 172/575 X |
| 5,724,902 | 3/1998 | Janelle et al. | 172/575 X |

FOREIGN PATENT DOCUMENTS

| | | |
|---|---|---|
| 0 579 909 A1 | 1/1994 | European Pat. Off. . |
| 0 772 963 A1 | 5/1997 | European Pat. Off. . |
| 2 413 864 | 8/1979 | France . |
| 819053 | 8/1959 | United Kingdom . |
| WO 81/03410 | 12/1981 | WIPO . |

*Primary Examiner*—Victor Batson
*Attorney, Agent, or Firm*—Oblon, Spivak, McClelland, Maier & Neustadt, P.C.

[57] ABSTRACT

A disk colter has a main disk for making a furrow in the ground. A secondary disk keeps the furrow open over a long enough distance that one or more seeds can be deposited. A support member supports the disks which are mounted so that they can rotate freely and are inclined in such a way that their peripheries meet in a region where the disks are closest to each other. This region is located at a bottom front part of the colter. On the main disk and/or the secondary disk, there is a plugging member intended to plug, at least in a vicinity of the region, a slot between the main disk and the secondary disk so that earth and/or plant debris are prevented from accumulating between the disks at least in the region.

25 Claims, 7 Drawing Sheets

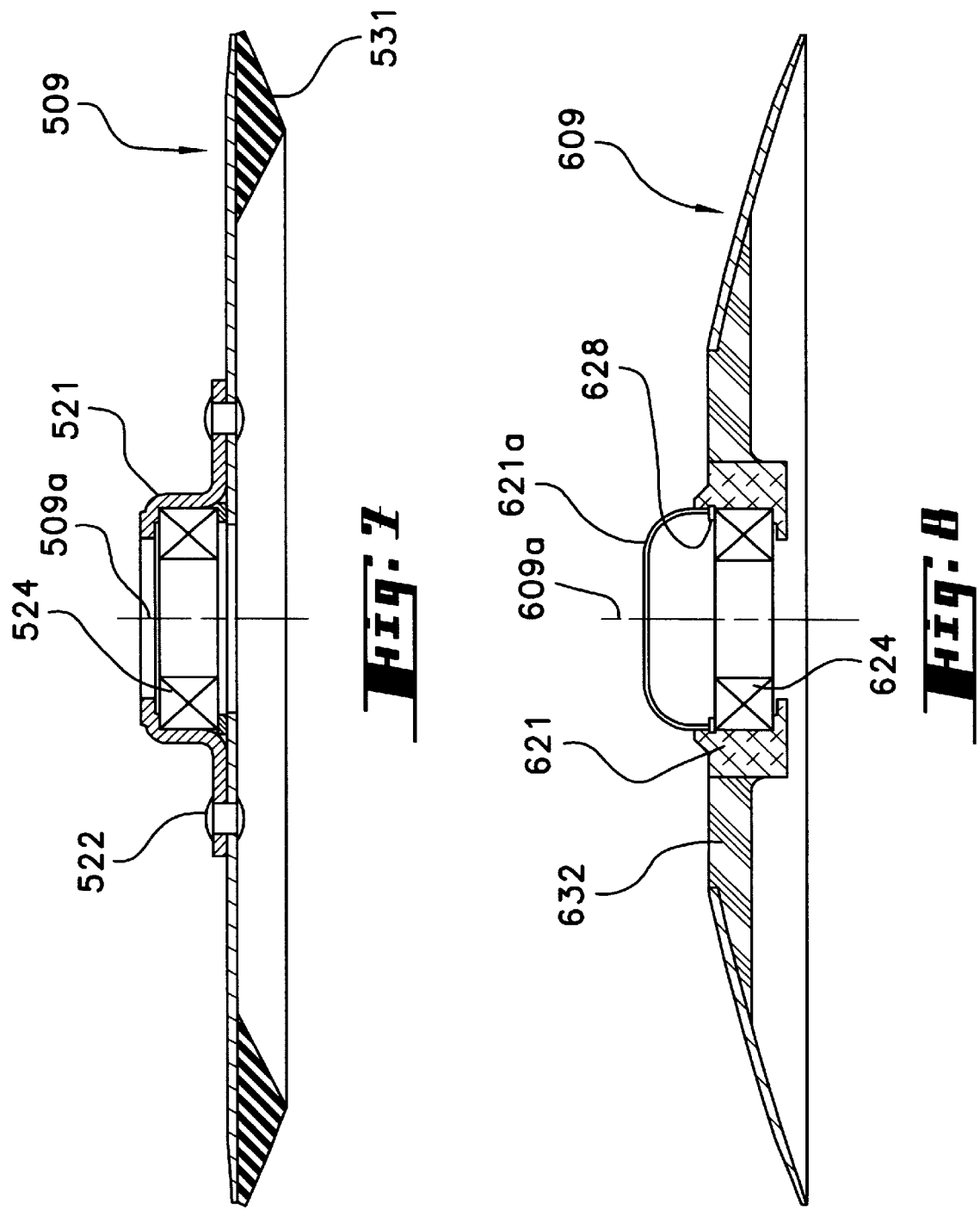

6,082,276

DISK COLTER FOR SEED DRILLS

BACKGROUND OF THE INVENTION

1. Field of the Invention

The present invention relates to the overall technical field of agricultural machinery of the seed drill type, or to any other type of machine, which works the ground and is equipped with a sowing device or is combined with such a device.

The invention relates more specifically to a seed drill with disk colters used for the sowing operations. Such disk colters are either incorporated directly into the seed drill or produced in the form of an auxiliary device, possibly removable, attached to a seed drill or to a machine suited to performing sowing operations. The invention therefore applies to various types of machinery and therefore to specific or varying sowing conditions.

2. Discussion of the Background

It is already known how to produce a disk colter for a seed drill, comprising:

- a main disk for making a furrow in the ground,
- a secondary disk for keeping said furrow open over a long enough distance that one or more seeds can be deposited,
- and
- a support member supporting the disks, which are mounted so that they can rotate freely and are inclined in such a way that their peripheries meet in a region located at the bottom front part of said colter, which is used for making the furrow.

Indeed, document EP-A-0 579 909 discloses a drill disk fitted with a colter attachment which supports two disks which, on the one hand, are inclined with respect to the vertical and, on the other hand, are free to rotate in an oblique position with respect to the direction of travel of the drill disk. The latter therefore comprises a main disk, produced as a concave disk in which a second disk at least partially engages. The second disk is made using a flexible material, so that the deformations of the main disk during work can be absorbed.

It has been observed that with such a drill disk earth can get in between the two disks during the sowing operations. This can, under certain conditions, lead to disruptions to the sowing operation.

SUMMARY OF THE INVENTION

The purpose of the present invention is therefore aimed at overcoming the drawbacks encountered in the state of the art and at producing a disk colter for seed drills, which disk colter can make an optimum and uniform furrow for any type of sowing and under various conditions of use associated with the nature or moisture of the ground, while keeping the reliability and durability of said sowing colter at an acceptable level.

Another purpose of the invention is aimed at producing a disk colter which is not very susceptible to phenomena of clogging and/or blocking.

The set purpose of the present invention is achieved in particular using a disk colter wherein there is provided, on the main disk and/or on the secondary disk, a plugging member intended to plug, at least in the vicinity of the region A, the slot there is between said main disk and said secondary disk.

In an advantageous embodiment of the disk colter according to the invention, the means of mounting the secondary disk comprise an elastic means allowing said secondary disk to part elastically from the main disk.

BRIEF DESCRIPTION OF THE DRAWINGS

Other features and advantages will emerge in greater detail from reading the description given hereafter with reference to the drawings which have been appended by way of non-limiting indication and in which:

FIGS. 3, 4, 5 and 6 depict additional ways of constructing a disk colter in accordance with the invention;

FIGS. 7 and 8 depict part views of additional ways of constructing a disk colter in accordance with the invention.

DESCRIPTION OF THE PREFERRED EMBODIMENT

In what follows of the description, reference will be made to various embodiments of the invention. These embodiments often relate to one (or more) part(s) or to one (or more) element(s) in isolation, the other parts of the machine or of the device in accordance with the invention remaining identical from one embodiment to another.

Thus, when moving on from one embodiment to another said element(s) or said part(s) of the machine or of the device in accordance with the invention bears (bear) the same label and is (are) given a reference increased or decreased by a figure that is a multiple of 100. The direction F shown in the figures corresponds to the direction of forward travel of the machine during work and therefore of the disk colter according to the invention.

The direction G shown in the figures represents the direction toward the ground in which the seeds are planted during the sowing operation.

Figure 1:
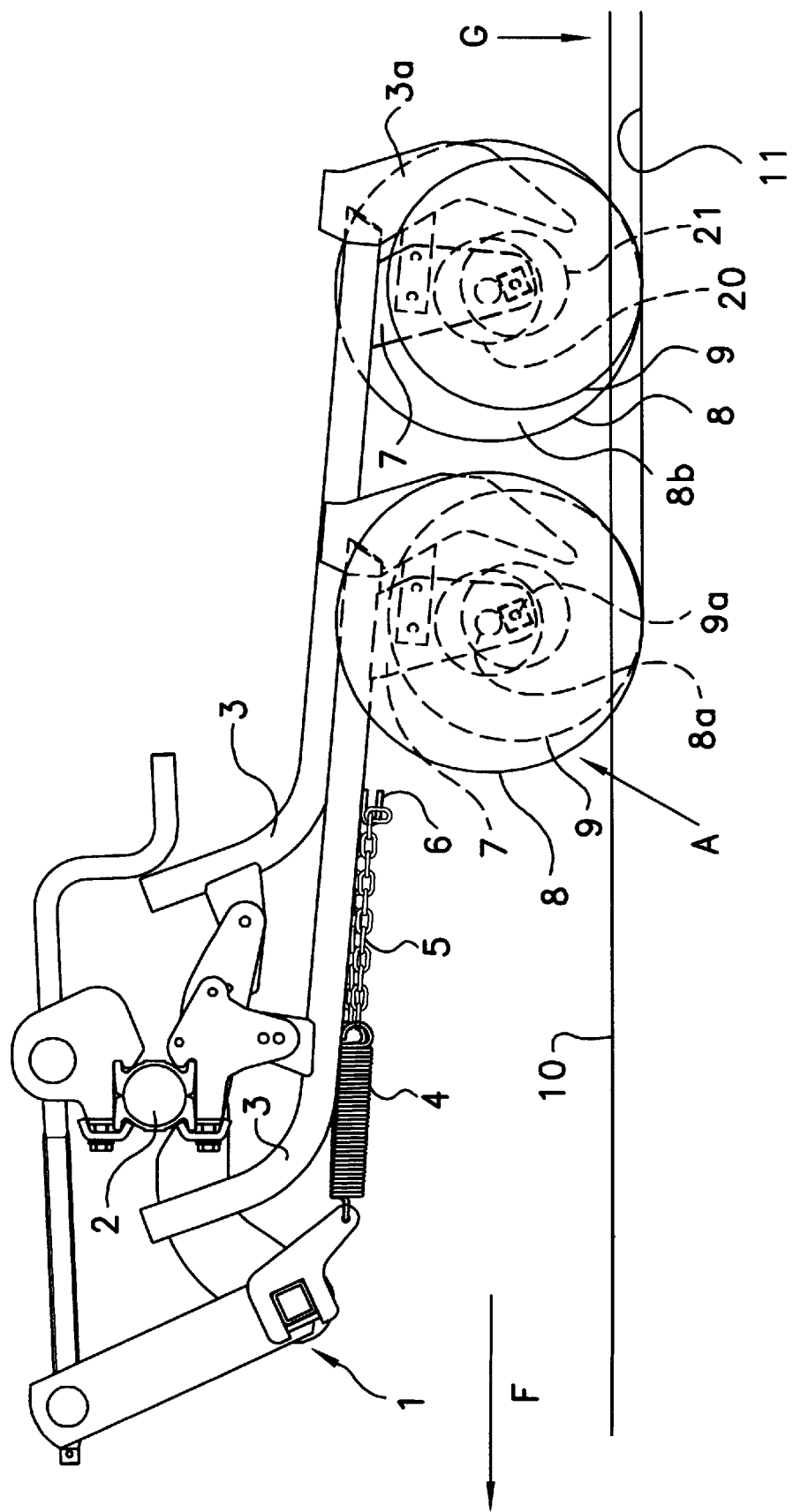
FIG. 1 depicts a side view of a device for planting seeds in the ground, comprising disk colters in accordance with the invention.

FIG. 1 depicts for example part of a seed drill comprising a device for planting seeds in the ground. This device is provided with disk colters in accordance with the invention. The device comprises a frame 1 consisting of a crossmember 2 to which there are attached, by any known means, supply tubes 3 which serve to convey the seeds from a hopper (not depicted) toward members 3a for planting said seeds.

Each supply tube 3 is also connected to part of the frame 1 using a spring 4 which is, for example, extended by a chain 5 attached to attachment means 6. These means, associated with the springs 4, allow an upward pivoting movement of the disk colter so that it can pass over an obstacle. The return force of the spring 4 then contributes to the return to an optimum sowing position and depth.

The attachment means 6, of the hook type, are advantageously arranged under the supply tubes 3.

The various embodiments of the disk colter in accordance with the invention depicted in FIGS. 2 to 8, can all be fitted to an agricultural machine as per the example sketched out in FIG. 1. Such a machine is suitable for operations of sowing directly into the ground or into a ground with various degrees of preparation.

FIG. 1 also shows a support member 7 supporting a main disk 8; 108; 208; 308; 408 and a secondary disk 9; 109; 209; 309; 409; 509; 609.

FIG. 1 advantageously shows two disk colters in accordance with the invention, in which the mounting of the main disk 8 is reversed from one colter to the next. If moving in the direction of forward travel F one encounters first of all a colter in which the secondary disk 9 is to the left, and then a colter in which the secondary disk 9 is to the right (in dotted line in the figure). The corresponding support member 7 is of course arranged and oriented accordingly. Such an alternating mounting is an illustrative example. In general, agricultural machinery has either a single type of mounting, in order to make the operations of replacing defecting parts easier, or a mounting in which the various colters alternate.

The support member 7 is produced with a cheek fixed by any means under the supply tube 3. The main disk 8; 108; 208; 308; 408 and the secondary disk 9; 109; 209; 309; 409; 509; 609 are mounted free to rotate on the support member 7, which for this purpose has shafts embodying the main axis of rotation 8*a;* 108*a;* 208*a;* 308*a;* 408*a* and the secondary axis of rotation 9*a;* 109*a;* 209*a;* 309*a;* 409*a;* 509*a;* 609*a* of said disks. The main axis of rotation 8*a;* 108*a;* 208*a;* 308*a;* 408*a* extends, for example, at right angles to the support member 7. The latter, for this purpose, has a particular orientation, giving the main disk 8; 108; 208; 308; 408 an optimum orientation for making a furrow 11.

The main disk 8; 108; 208; 308; 408 preferably extends in an oblique plane, oriented at an angle to an imaginary vertical plane containing the direction of forward travel F (FIGS. 2 to 6). The angular orientation advantageously has a horizontal component at right angles to the direction of forward travel F and representing an inclination i of about 5°.

Thus, according to one of FIGS. 2 to 6, the plane in which the main disk 8; 108; 208; 308; 408 extends is inclined with respect to an axis h–h' parallel to the direction of forward travel F.

The secondary disk 9; 109; 209; 309; 409; 509; 609 has the opposite inclination to the main disk 8; 108; 208; 308; 408 so as to form a region A corresponding to that part of the colter which is used to make the furrow 11. The peripheries of the disks 8; 108; 208; 308; 408, 9; 109; 209; 309; 409; 509; 609 meet in the region A situated at the front of said colter. The inclination of the secondary disk 9; 109; 209; 309; 409; 509; 609 is obtained through the fact that it is mounted on the support member 7. The same is true of the main disk 8; 108; 208; 308; 408.

Advantageously, the secondary disk 9; 109; 209; 309; 409; 509; 609 has, compared with the main disk 8; 108; 208; 308; 408, on the one hand, a smaller diameter and, on the other hand, a secondary axis of rotation 9*a;* 109*a;* 209*a;* 309*a;* 409*a;* 509*a;* 609*a* which is offset and inclined with respect to the main axis of rotation 8*a;* 108*a;* 208*a;* 308*a;* 408*a.*

The main disk 8; 108; 208; 308; 408 and the secondary disk 9; 109; 209; 309; 409; 509; 609 are also inclined with respect to the vertical so that the peripheries of said disks 8; 108; 208; 308; 408, 9; 109; 209; 309; 409; 509; 609 meet at the bottom of the colter, in the direction G directed toward the ground 10.

Such an arrangement allows the peripheries of the disks 8; 108; 208; 308; 408, 9; 109; 209; 309; 409; 509; 609 situated toward the front, when considering the direction of forward travel F, to converge. Such convergence is advantageous, on the one hand, when making and forming the furrow 11, and, on the other hand, in avoiding earth or plant debris getting in between the disks 8; 108; 208; 308; 408, 9; 109; 209; 309; 409; 509; 609.

The particular positioning of the main disk 8; 108; 208; 308; 408 with respect to the secondary disk 9; 109; 209; 309; 409; 509; 609, the smaller diameter and the offset of the second axis of rotation 9*a;* 109*a;* 209*a;* 309*a;* 409*a;* 509*a;* 609*a* of the secondary disk 9; 109; 209; 309; 409; 509; 609 has the not-insignificant advantage of cleaning the main disk 8; 108; 208; 308; 408 during work. The periphery of the secondary disk 9; 109; 209; 309; 409; 509; 609 situated toward the front acts as a scraper in the vicinity of the inside 8*b* of the main disk 8; 108; 208; 308; 408. The inside 8*b* of the main disk 8; 108; 208; 308; 408 obviously corresponds to the side facing the secondary disk 9; 109; 209; 309; 409; 509; 609.

The supply tube 3 opens into the planting member 3*a.* The latter has one end which fits between the main disk 8; 108; 208; 308; 408 and the secondary disk 9; 109; 209; 309; 409; 509; 609 so as to deposit the seeds in the bottom of the furrow 11.

Figure 2:
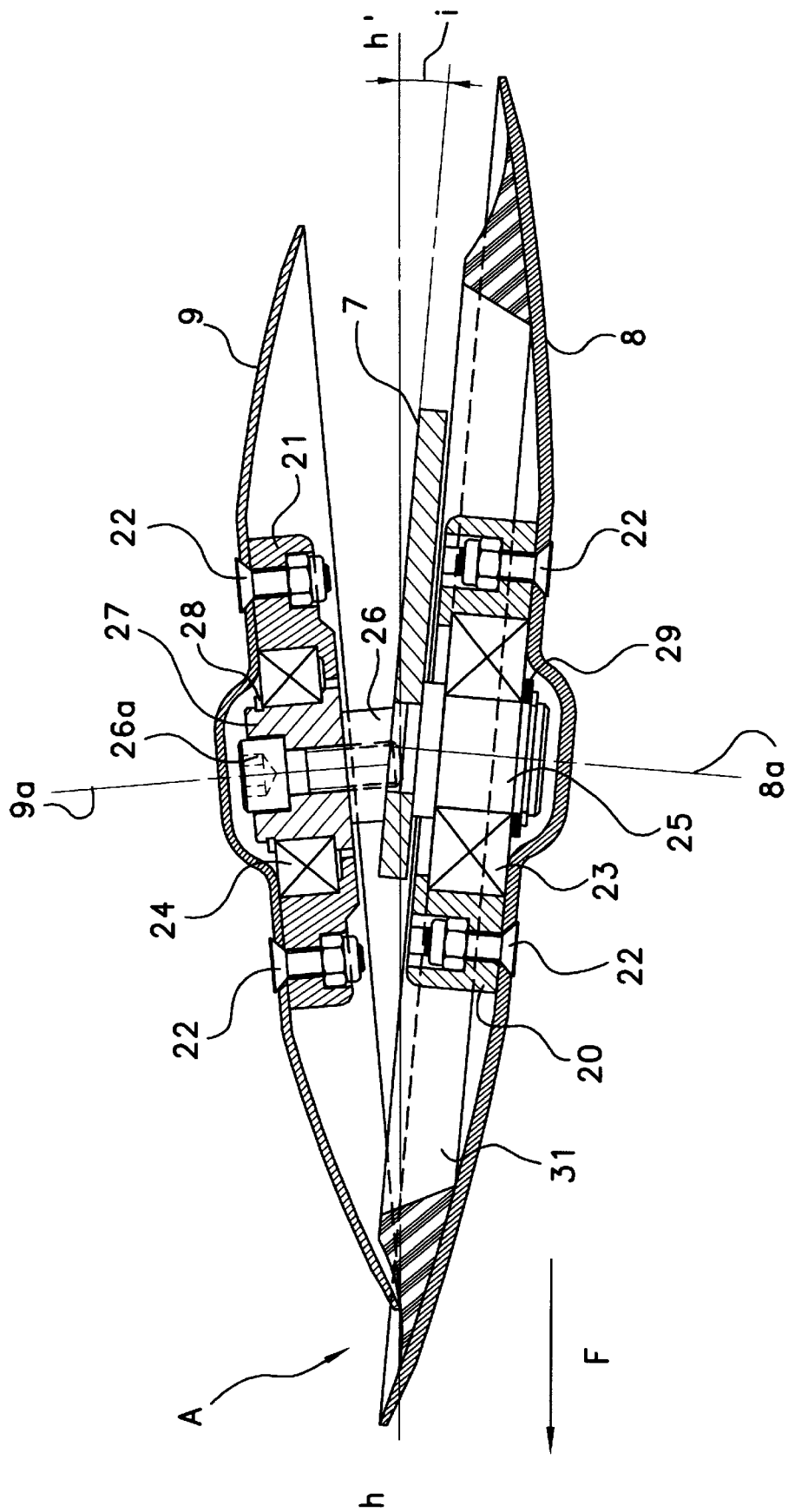
FIG. 2 depicts one from above, in section on planes orthogonal to the disks, of a disk colter in accordance with the invention.

The characteristics of the mounting of the disks 8, 9 particularly for FIGS. 3 to 8 will not be redescribed, insofar as they do not diverge from the characteristics of the mounting in FIGS. 1 and 2.

The disk colter in accordance with the invention also has a plugging member 31; 131; 231; 331; 531 which essentially extends between the main disk 8; 108; 208; 308 and the secondary disk 9; 109; 209; 309; 509; 609. The plugging member 31; 131; 231; 331; 431; 531 is provided on one of the disks 8; 108; 208; 308; 408, 9; 109; 209; 309; 409; 509; 609 and extends at least locally right into the internal volume generated by the shape of the other disk 8; 108; 208; 308; 408, 9; 109; 209; 309; 409; 509; 609.

The plugging member 31; 131; 231; 331; 431; 531 is advantageously provided on one of the disks 8; 108; 208; 308; 408, 9; 109; 209; 309; 409; 509; 609, the other of said disks 8; 108; 208; 308; 408, 9; 109; 209; 309; 409; 509; 609 coming into contact with said plugging member 31; 131; 231; 331; 431; 531. The latter is, for example, of circular shape. Thus, the plugging member 31; 131; 231; 331; 431; 531 is, for example, ring-shaped.

The plugging member 31; 131; 231; 331; 531 may also be shaped as a bulge.

Said plugging member 31; 131; 231; 331; 431; 531 is advantageously made of a flexible material. The latter is advantageously made of an abrasion-resistant material.

The plugging member 31; 131; 231; 331; 431 may also be attached to the corresponding disk 8; 108; 208; 308; 408, 9; 109; 209; 309; 409; 509; 609, and this may, for example, be by bonding or vulcanizing.

The plugging member 31; 131; 231; 331 is for example provided on the main disk 8; 108; 208; 308.

According to an advantageous embodiment of the disk colter in accordance with the invention, at least one of said disks 8; 108; 208; 308; 408, 9; 109; 209; 309; 409; 509; 609 is concave in shape. The plugging member 31; 131; 231; 331 is then advantageously provided on a concave face of the corresponding disk 8; 108; 208; 308; 408, 9; 109; 209; 309; 409; 609.

According to an advantageous embodiment, the secondary disk 9; 109; 209; 309; 409; 509; 609 extends, at least in the region A, into the volume swept by the main disk 8; 108; 208; 308; 408.

FIG. 2 in particular depicts a view from above, in section, of a disk colter in accordance with the invention. The section is taken on planes at right angles to each disk 8; 9 and passing through their axis of rotation 8*a;* 9*a.* The sectioning planes are therefore inclined with respect to one another. In this embodiment, the main disk 8 and the secondary disk 9 are essentially concave in shape.

The disks 8, 9 also meet at their periphery in the direction of forward travel F, that is to say toward the front of the colter.

Advantageously, the main disk 8; 108; 208; 308; 408 is mounted on the support member 7; 107; 207; 307; 407 using mounting means comprising a main bearing block 20; 120; 220; 320; 420 fixed to said main disk 8; 108; 208; 308; 408, a main shaft 25; 125; 225; 325; 425 and a bearing 23; 123; 223; 323; 423 which provides the interface between said main bearing block 20; 120; 220; 320; 420 and said main shaft 25; 125; 225; 325; 425.

The secondary disk 9; 109; 209; 309; 409; 509; 609 is mounted on the support member 7; 107; 207; 307; 407 using mounting means comprising a secondary bearing block 21; 121; 221; 321; 421; 521; 621 fixed to said secondary disk 9; 109; 209; 309; 409; 509; 609, a secondary shaft 26–26a–27; 126–126a–127; 226–226a–227; 326–326a–327; 426–426a–427 and a bearing 24; 124; 224; 324; 424; 524; 624 which provides the interface between said secondary bearing block 21; 121; 221; 321; 421; 521; 621 and said secondary shaft 26–26a–27; 126–126a–127; 226–226a–227; 326–326a–327; 426–426a–427.

The main disk 8 and the secondary disk 9 are equipped respectively with the main bearing block 20 and with the secondary bearing block 21. Each bearing block 20, 21 is fixed to its respective disk 8, 9 using means such as fastening screws 22. The bearing blocks 20, 21 have appropriate housings for positioning the bearings 23, 24, for example ball bearings, which are centered respectively on the main axis of rotation 8a and secondary axis of rotation 9a.

The bearings 23 and 24 are advantageously immobilized between the bearing blocks 20, 21 and the respective disks 8, 9.

A mounting piece 27 is for example attached and fixed to the secondary shaft 26 using an additional screw 26a. The secondary shaft 26 is fixed to the support member 7 and has, for example, a rectangular or circular cross section. The secondary shaft 26 also has a particular orientation intended to give the secondary disk 9 an optimum orientation and thus to cooperate with the main disk 8.

The mounting piece 27 has a configuration allowing it to house the bearing 24. The mounting piece 27 is also machined in such a way as to retain a retaining ring 28 which serves to hold the bearing 24 in place. The secondary disk 9 and the secondary bearing block 21 therefore constitute a subassembly which rotates about the axis of rotation 9a during sowing work.

The secondary disk 9 is therefore mounted on the support member 7 using mounting means comprising the bearing block 21 fixed to said secondary disk 9, the secondary shaft 26 associated with the mounting piece 27 and the bearing 24 providing the interface between said mounting piece 27 and the bearing block 21.

Another retaining ring 29 is, for example, used to hold the bearing in place on the main shaft 25. Such mounting is known per se.

FIG. 2 also shows a material, for example an abrasion-resistant material, attached to one of the disks 8, 9 so as more or less to obstruct the access to the interior volume defined by said disks 8, 9. The material in question, in this case the plugging member 31, for example has a configuration of the ring type, arranged in the vicinity of the interior periphery of the main disk 8.

The secondary disk 9, and more particularly its periphery, comes more or less into contact with said ring.

The periphery of the secondary disk 9 comes into contact, or almost into contact, with the plugging member 31 so as to close the leading region A of the disk colter. This therefore prevents earth and/or plant debris from getting in between the disks 8, 9. The plugging member 31 is, for example, fixed to the main disk 8 by any known means and, in particular, by bonding, vulcanizing, riveting or screwing.

In the examples depicted in FIGS. 2 to 5, the plugging member 31 has a shape adapted to the concave shape of the secondary disk 9; 109; 209; 309 so that it will not impede any rotation of said secondary disk 9; 109; 209; 309 relative to the main disk 8.

According to another embodiment, at least one of the mounting means also comprises an elastic means 132; 232; 332; 632 allowing the corresponding disk to part from the other disk of the colter.

The elastic means 132 consists of an elastic ring of the "silentbloc" type borne by the corresponding shaft 126–126a–127–132. The elastic means 232; 632 may also constitute part of the corresponding bearing block 221; 621.

According to another embodiment, the elastic means 332 fully constitutes the corresponding bearing block 321. It is advantageously the means of mounting the secondary disk 109; 209; 309; 609 which comprise the elastic means 132; 232; 332; 632.

Figure 3:
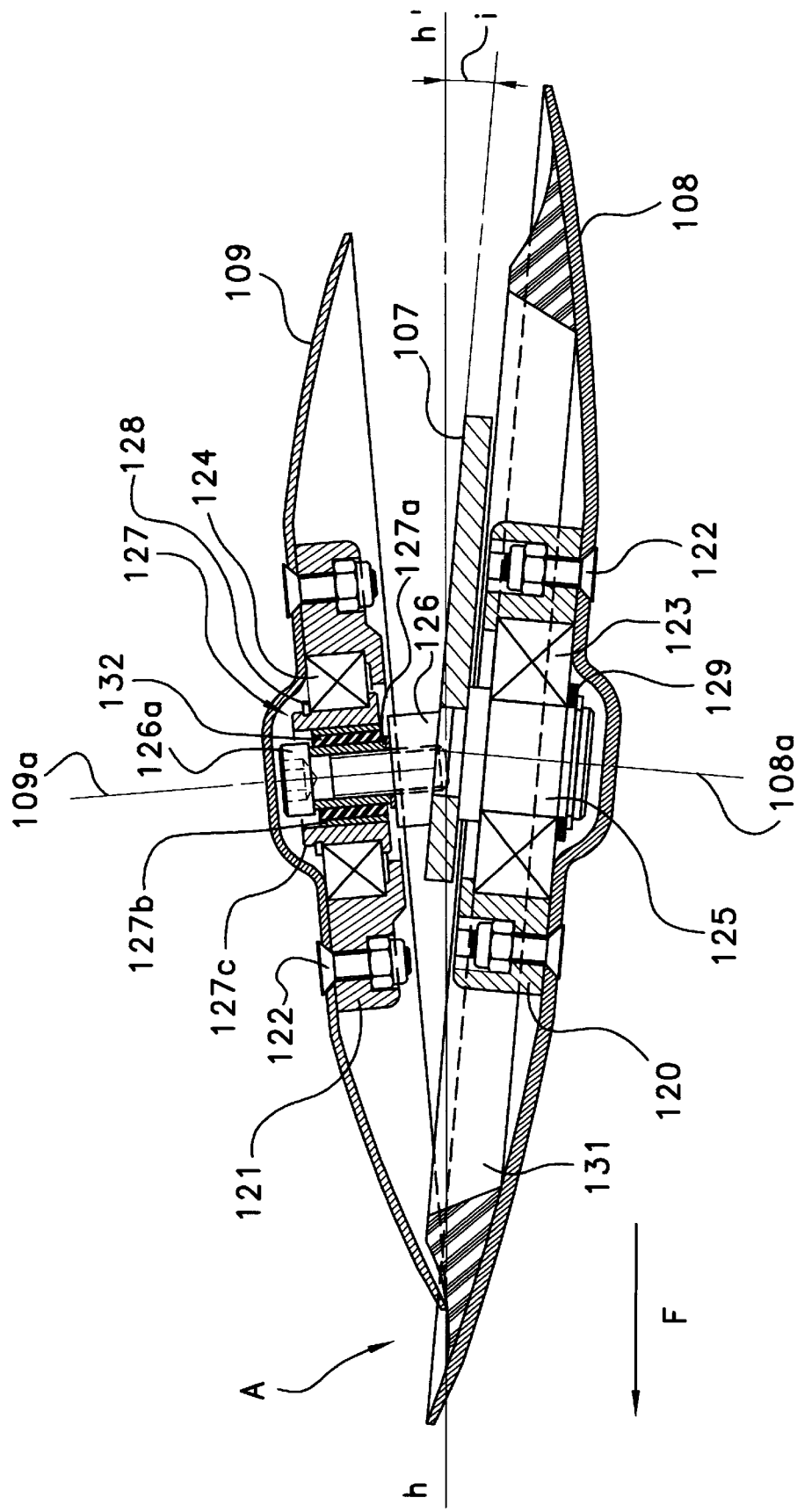
FIG. 3 depicts another way of constructing a disk colter in accordance with the invention.

Thus, FIG. 3 in particular depicts another embodiment for a disk colter in accordance with the invention, in which embodiment at least one of the means of mounting the secondary disk 109 also comprises the elastic means 132 allowing the secondary disk 109 to part elastically from the main disk 108.

The elastic means 132 (FIG. 3) provides the connection between a core 127a and a central part 127b of the mounting piece 127. The central part 127b is secured to a casing 127c on which the bearing 124 is mounted.

The elastic means 132, of the "silentbloc" type, and therefore the core 127a and the central part 127b thus produce an elastic articulation. The elastic means 132 consist, for example, of a material of the elastomeric type.

The elasticity and the desired flexibility of the mounting are therefore incorporated into the mounting piece 127 and allow the secondary disk 109, when stressed, to part from the main disk 108 in the direction of the axis of rotation 109a and/or in the direction of an axis at right angles to the axis of rotation 109a.

The elastic means 132 also allows optimum closure of the region A, in which region the periphery of the secondary disk 109 can exert a slight pressure on the plugging member 131.

Figure 4:
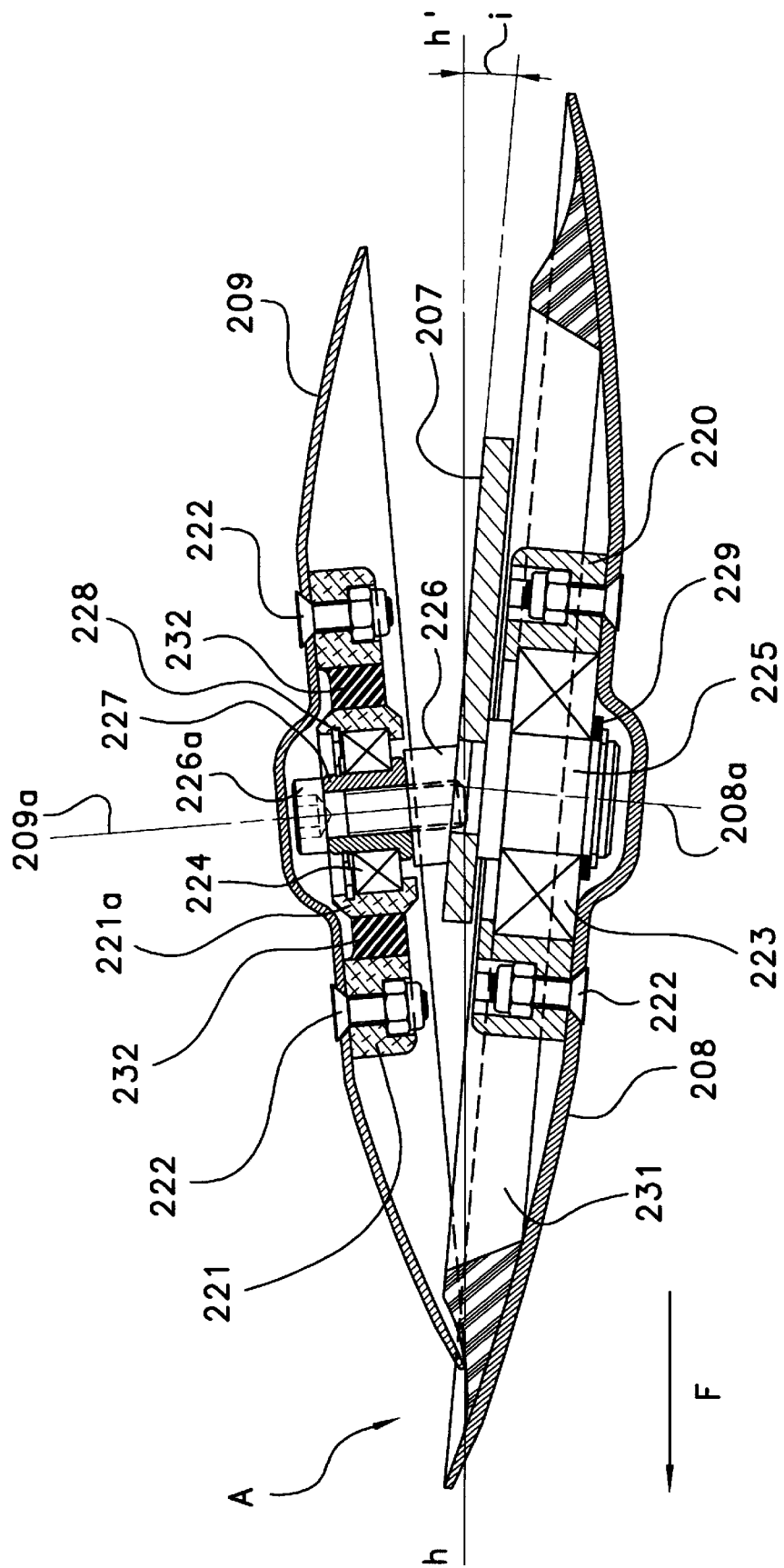

In the embodiment depicted in FIG. 4, the elastic means 232 is incorporated directly into the bearing block 221. The latter therefore has a central part 221a surrounding the bearing 224, which is mounted on the mounting piece 227. The peripheral part of the bearing block 221 is fixed to the secondary disk 209 using the screws 222 and has sufficient rigidity for this. The central part 221a is also made with a rigid material. The elastic means 232 in this case consist of a material capable of closely connecting the rigid parts of the bearing block 221. The flexibility of the elastic means 232 thus allows the secondary disk 209 to part from the main disk 208, the central part 221a being only allowed to rotate about the axis of rotation 209a. The elastic means 232 for example is annular in shape.

Figure 5:
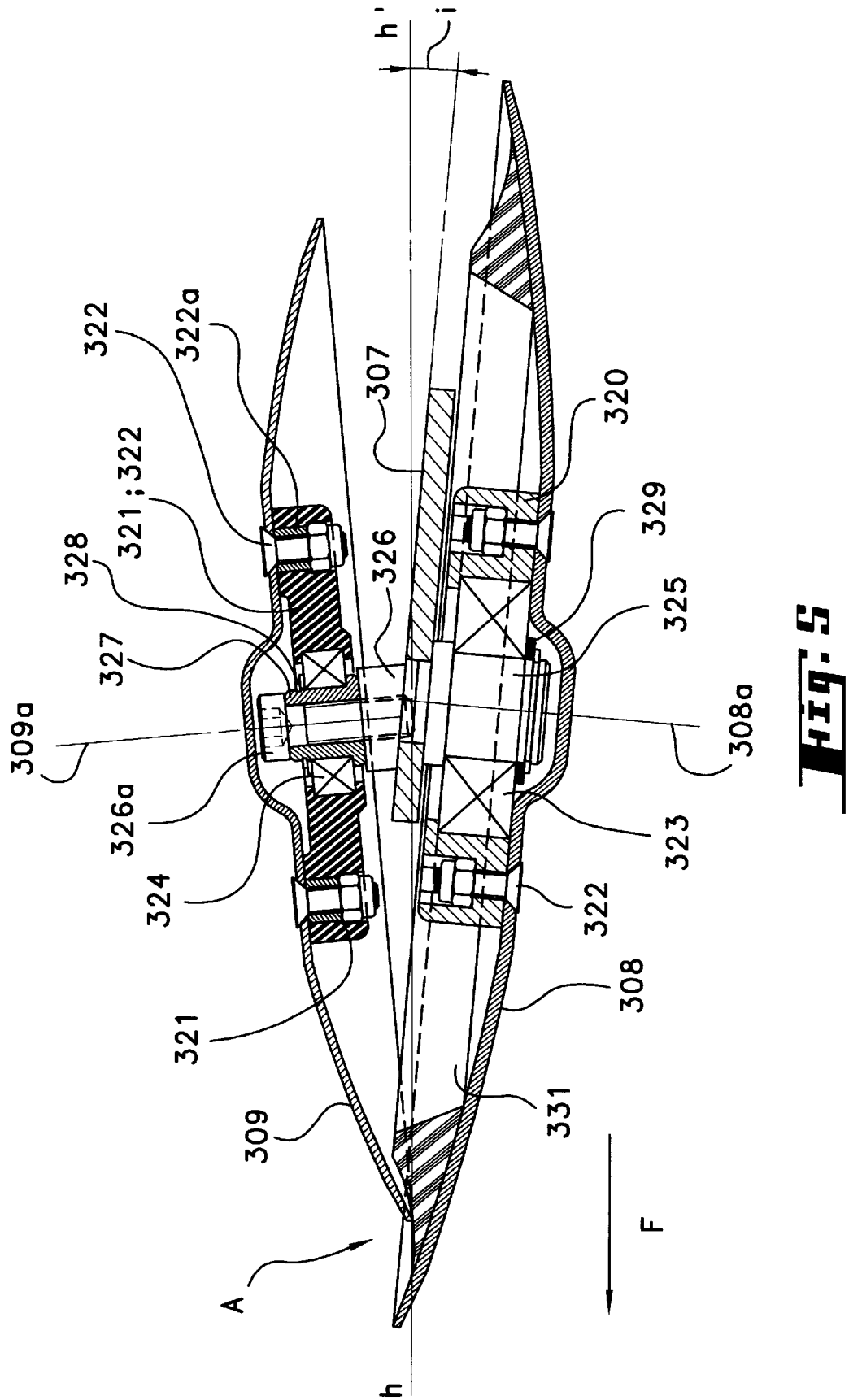

According to an additional embodiment of a disk colter in accordance with the invention, and which is depicted in FIG. 5, the bearing block 321 itself constitutes the elastic means 332. The bearing block 321 is therefore entirely made of a flexible material. The bearing block 321 therefore has enough elasticity to allow movements of the secondary disk 309. The fastening screws 322 are advantageously associated with rigid tubular inserts 322a so that the bearing block 321 can be fastened securely to the secondary disk 309. The head of each fastening screw 322 rests on the secondary disk 309 and the nut fitted onto said screw 322 rests on the tubular insert 322a, holding the bearing block 321 in place. An elastic and reversible deformation of the bearing block 321 thus allows the secondary disk 309 to move away while at the same time maintaining a firm mounting of the mounting piece 327, associated with the bearing 324, on the secondary shaft 326.

This solution has the advantage that the bearing 324 can be overmolded directly onto the bearing block 321.

Figure 6:
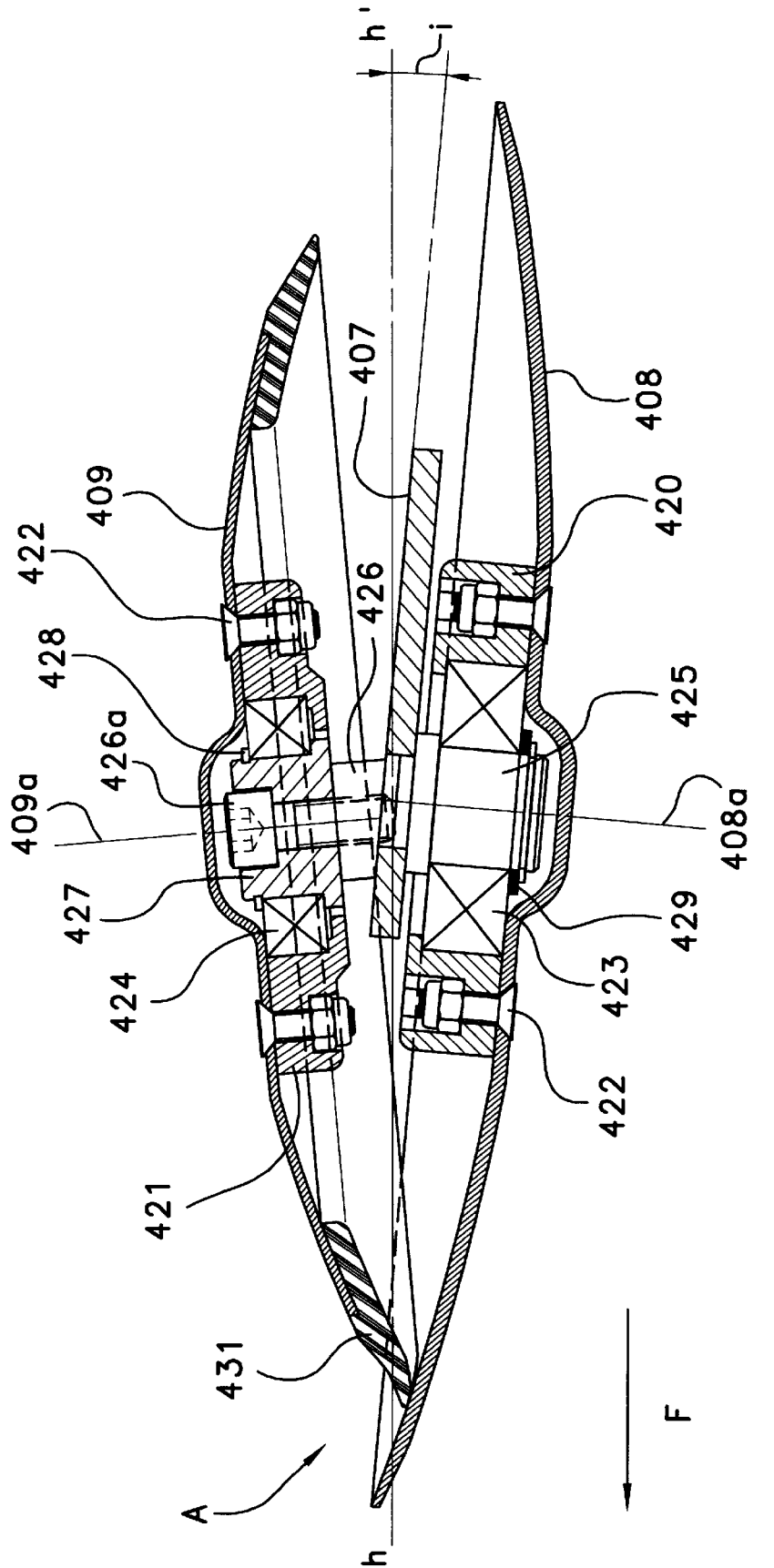

According to an additional embodiment of the invention, depicted for example in FIG. 6, the secondary disk 409 is equipped at its periphery with an annular wiper, advantageously abrasion-resistant on the one hand, and supple or flexible on the other. The plugging member 431 thus consists of a lip or wiper at the periphery of the corresponding disk 409.

The wiper comes directly into contact with the internal face of the main disk 408. The consequence of such contact is that it slightly deforms the wiper and allows the leading region A for attacking the ground 10 to be plugged.

The wiper is preferably fixed to the secondary disk 409 by any known means, particularly by bonding. The use of such a wiper or lip for the plugging member 431 allows the secondary disk 409 to be mounted without the use of an additional elastic means.

FIG. 7 depicts a secondary disk 509 which is flat and circular in shape. The plugging member 531, for example a ring, made of a flexible material, is attached to the periphery of said disk 509 by any known means.

The rigid bearing block 521 is fixed and centered using screws 522 or rivets (FIG. 7) onto the outer face of the secondary disk 509, said outer face coming, together with a peripheral strip, partially into contact with a wall of the furrow 11. The plugging member 531 is attached to the other face, situated opposite the main disk (not depicted in this example).

FIG. 8 depicts another example for producing the disk colter in accordance with the invention. Thus, the secondary disk 609 consists of the central bearing block 621 supporting the bearing 624. The latter is held in position by virtue of the retaining ring 628. Advantageously, a cap 621a covers the region in which the bearing 624 is mounted.

The bearing block 621 is secured to the elastic means 632, which surrounds said bearing block 621. The rigid periphery of the secondary disk 609 is bonded or fixed by any means to the periphery of the elastic means 632.

The example depicted in FIG. 8 shows a rigid periphery of essentially concave or, more specifically, essentially frustoconical shape. The rigid periphery, which comes into contact with one wall of the furrow 11 is therefore able to part from the main disk (not depicted in this figure) as a result of deformation of said main disk or as a result of the presence of stones or other debris that may well become jammed between the disks. The elasticity of the interface (elastic means 632) between the rigid periphery and the bearing block 621 makes it possible to obtain optimum operation and an excellent adaptation to varying working conditions.

An appreciable advantage is obtained by the disk colter in accordance with the invention, insofar as any deformation of the main disk 8; 108; 208; 308; 408 runs no risk of blocking and/or of deforming the secondary disk 9; 109; 209; 309; 409; 509; 609, said disks therefore always fulfilling their respective functions.

The abrasion-resistant material, particularly the plugging member 31; 131; 231; 331; 431; 531 is, for example, made of polyurethane. Other materials, for example known supple or flexible materials, may also be appropriate without departing from the scope of the present invention.

The disks 8; 108; 208; 308; 408, 9; 109; 209; 309; 409; 509; 609 or their rigid part(s) are preferably made of metal, but other rigid materials, preferably ones which are not liable to abrade, may also be appropriate.

What is claimed as new and desired to be secured by letters patent of the United States is:

1. A disk colter for a seed drill, comprising:

a main disk for making a furrow in the ground;

a secondary disk for keeping said furrow open over a long enough distance that one or more seeds can be deposited, and a support member supporting said disks, which are mounted so that they can rotate freely and are inclined in such a way that their peripheries meet in a region where said disks are closest to each other, said region being located at a bottom front part of said colter, wherein there is provided, on the main disk a on the secondary disk, a plugging member intended to plug, at least in a vicinity of the region, a slot between said main disk and said secondary disk so that earth or plant debris are prevented from accumulating between said disks at least in said region.

2. A disk colter as claimed in claim 1, wherein the plugging member essentially extends between the main disk and the secondary disk.

3. A disk colter as claimed in claim 2, wherein the plugging member is provided on one of the disks and extends at least locally right into an internal volume generated by a shape of the other disk.

4. A disk colter as claimed in claim 1, wherein the plugging member is provided on one of the disks and the other of said disks comes into contact with said plugging member.

5. A disk colter as claimed in claim 1, wherein the plugging member is of circular shape.

6. A disk colter as claimed in claim 5, wherein the plugging member is ring-shaped.

7. A disk colter as claimed in claim 5, wherein the plugging member is shaped as a bulge.

8. A disk colter as claimed in claim 5, wherein the plugging member consists of a lip located at the periphery of the corresponding disk.

9. A disk colter as claimed in claim 1, wherein the plugging member is made of a flexible material.

10. A disk colter as claimed in claim 1, wherein the plugging member is made of an abrasion-resistant material.

11. A disk colter as claimed in claim 1, wherein the plugging member is attached to the corresponding disk.

12. A disk colter as claimed in claim 11, wherein the plugging member is attached to the corresponding disk by bonding or vulcanizing.

13. A disk colter as claimed in claim 1, wherein the plugging member is provided on the main disk.

14. A disk colter as claimed in claim 1, wherein at least the main disk is concave in shape.

15. A disk colter as claimed in claim 14, wherein the plugging member is provided on the concave face of the corresponding disk.

16. A disk colter as claimed in claim 1, wherein the secondary disk has, with respect to the main disk, on one hand, a smaller diameter and, on another hand, an axis of rotation which is offset with respect to an axis of rotation of said main disk.

17. A disk colter as claimed in claim 14, wherein the secondary disk extends, at least in the region, into a volume swept by the main disk.

18. A disk colter as claimed in claim 1, wherein the support member is fixed to a seed-supply tube.

19. A disk colter as claimed in claim 1, wherein the main disk is mounted on the support member using mounting means comprising a bearing block fixed to said main disk, a main shaft and a bearing which provides an interface between said bearing block and said main shaft.

20. A disk colter as claimed in claim 1, wherein the secondary disk is mounted on the support member using mounting means comprising a bearing block fixed to said secondary disk, a secondary shaft and a bearing which provides an interface between said bearing block and said secondary shaft.

21. A disk colter as claimed in claim 20, wherein said mounting means also comprises an elastic means allowing the corresponding disk to part elastically from another disk.

22. A disk colter as claimed in claim 21, wherein the elastic means consists of an elastic ring of a "silentbloc" type borne by a corresponding shaft.

23. A disk colter as claimed in claim 21, wherein the elastic means constitutes part of a corresponding bearing block.

24. A disk colter as claimed in claim 21, wherein the elastic means fully constitutes a corresponding bearing block.

25. A device for planting seeds in the ground comprising at least one disk colter as claimed in claim 1.

* * * * *

UNITED STATES PATENT AND TRADEMARK OFFICE
CERTIFICATE OF CORRECTION

PATENT NO. : 6,082,276

DATED : July 4, 2000

INVENTOR(S): JEAN KLEIN ET AL.

It is certified that an error appears in the above-identified patent and that said Letters Patent is hereby corrected as shown below:

Column 8, Claim 1, line 11, change "a" to --or--.

Signed and Sealed this

Seventeenth Day of April, 2001

Attest:

NICHOLAS P. GODICI

Attesting Officer      Acting Director of the United States Patent and Trademark Office